(12) United States Patent
Frampton et al.

(10) Patent No.: US 12,066,674 B2
(45) Date of Patent: Aug. 20, 2024

(54) TELECOMMUNICATIONS ENCLOSURE

(71) Applicant: Prysmian S.p.A., Milan (IT)

(72) Inventors: Simon James Frampton, Bishopstoke (GB); Nathan Paddick, Bishopstoke (GB)

(73) Assignee: Prysmian S.p.A., Milan (IT)

( * ) Notice: Subject to any disclaimer, the term of this patent is extended or adjusted under 35 U.S.C. 154(b) by 2 days.

(21) Appl. No.: 17/880,377

(22) Filed: Aug. 3, 2022

(65) Prior Publication Data
US 2023/0041299 A1 Feb. 9, 2023

(51) Int. Cl.
*G02B 6/44* (2006.01)

(52) U.S. Cl.
CPC ....... *G02B 6/4444* (2013.01); *G02B 6/44775* (2023.05)

(58) Field of Classification Search
CPC .................................................. G02B 6/44775
See application file for complete search history.

(56) References Cited

U.S. PATENT DOCUMENTS

| | | | | |
|---|---|---|---|---|
| 5,775,702 A * | 7/1998 | Laeremans | .......... | G02B 6/4471 174/152 G |
| 8,207,445 B2 | 6/2012 | Knorr et al. | | |
| 11,002,929 B2 * | 5/2021 | Geens | .................. | H02G 15/013 |
| 2015/0071598 A1 * | 3/2015 | Badura | .............. | G02B 6/44775 385/135 |
| 2015/0168664 A1 * | 6/2015 | Coenegracht | ........ | G02B 6/4446 385/135 |
| 2020/0249407 A1 | 8/2020 | Aznag et al. | | |
| 2020/0319420 A1 * | 10/2020 | Cams | .................. | G02B 6/4454 |

FOREIGN PATENT DOCUMENTS

WO WO 98/21799 5/1998
WO WO 2016/205340 12/2016

OTHER PUBLICATIONS

European Search Report in Application No. 22188036.2-1020 dated Dec. 12, 2022.

* cited by examiner

*Primary Examiner* — Eric Wong
(74) *Attorney, Agent, or Firm* — Haynes and Boone, LLP

(57) ABSTRACT

The present disclosure discloses a telecommunications enclosure (1) and a method for coupling a cable to a cable port of the telecommunications enclosure. The latter comprises a casing (10), a base (20) adapted to be removably coupled to the casing (10), and a plurality of sealing assemblies (40) adapted to be removably coupled to the base (20). Each sealing assembly (40) comprises an elastically deformable sealing module (43) interposed between a first member (46) and a second member (58). The first member (46) and second member (58) comprise each a main portion (47, 59) and a movable portion (51, 63), wherein the movable portion (51, 63) is movable between an open position, wherein a cable is allowed to access to the elastically deformable sealing module (43), and a closed position; the elastically deformable sealing module (43) has an access (44) to allow the cable to enter the respective cable port (42) when the movable portions (51, 63) are in the open position. In the closed position, the movable portions (51, 63) are coupled to the respective main portion so as to wrap the cable. The elastically deformable sealing module (43) is held by the main portions (47, 59) while the movable portions (51, 63) are in the open position.

19 Claims, 9 Drawing Sheets

TELECOMMUNICATIONS ENCLOSURE

CROSS-REFERENCE TO RELATED APPLICATION

This application claims priority to Italian patent application number 102021000021098, filed Aug. 4, 2021, the entire disclosure of which is hereby incorporated herein by reference.

The present disclosure relates to a telecommunications enclosure as well as to a method for coupling a cable to a cable port of a telecommunications enclosure.

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers.

Generally, a telecommunications enclosure comprises a plurality of splice trays for storing and splicing optical fibers together. Storage areas may be provided upstream the splice area to store extra-length portions of the optical fibers which are actually used as well as to store optical fibers which are not used. A telecommunications enclosure may further comprise routing elements, namely transportation tubes or routing channels, for suitably directing optical fibers, which may be grouped in fiber modules, which enter and exit the telecommunications enclosure, towards the splice trays and away from the splice trays.

Telecommunications enclosures are typically sealed to inhibit the intrusion of moisture or other contaminants. Pressurized gel-type seals have been used to effectively seal the locations where telecommunications cables enter and exit telecommunications enclosures.

U.S. Pat. No. 8,207,445 discloses a sealing body for a cable sleeve, comprising a central sealing body segment and a plurality of cylinder-segment-like sealing body segments that can be inserted into respective recesses made in the central sealing body segment in a radial direction thereof. A cable entry opening for sealing a cable is embodied in the area of each recess and of each cylinder-segment-like sealing body segment. Accordingly, a cable can be individually sealed in the corresponding cable entry opening. Each cylinder-segment-like sealing body segment has a gel-like sealing element between two opposite plates. A force can be exerted on one of the two plates by means of a pressure element in order to compress the gel-like sealing element. The gel-like sealing element is thus pressed against a cable laid in the corresponding cable entry opening in order to seal said cable in the area of the cable entry opening. Each gel-like sealing element of a cylinder-segment-like sealing body segment acts together with a gel-like sealing body element arranged in the respective recess of the central sealing body segment.

US 2020/0249407 discloses a telecommunications enclosure including a housing that comprise a dome that attaches to a base. A telecommunications assembly unit is housed within the housing. The telecommunications assembly unit includes a fiber optic manager coupled to a gel sealing unit. The gel sealing unit includes a gel sealing block that mounts within an actuator that is adapted to axially compress the gel sealing block to provide sealing. Sealing includes sealing of any cables routed through the cable ports defined by the gel sealing block. The gel sealing block includes a plurality of individual gel sealing modules. When the gel sealing modules are assembled together to form the gel sealing block, opposite sides of adjacent gel sealing modules seal relative to one another. The gel sealing modules are individually and separately removable from between inner and outer pressurization structures of the actuator. The gel sealing modules include cable sealing modules each defining at least one cable port. Each gel sealing module includes first and second gel portions (e.g., volumes of gel) that meet at a separable interface at which the respective cable port is defined. The first and second gel portions can be separated from one another when the cable sealing module is not mounted between the inner and outer pressurization structures to allow a cable to be laterally inserted into the cable port (i.e., the gel sealing modules can have a wrap-around design). Each gel sealing module also includes end caps between which an axis of the cable port extends. The end caps function to provide gel containment when the gel block is pressurized during sealing. The end caps include first end cap portions attached to opposite ends of the first gel portion and second end cap portions attached to opposite ends of the second gel portion. The first and second end cap portions are carried with their respective first and second gel portions when the gel portions are separated from one another. Thus, the first and second end cap portions separate from one another when the first and second gel portions are separated from one another.

The Applicant notes that in the solution disclosed by U.S. Pat. No. 8,207,445, when a cable has to be coupled to the sealing body, the appropriate cylinder-segment-like sealing body segment is moved away from the respective recess of the central sealing body segment, the cable is inserted into the recess in a radial direction, and the cylinder-segment-like sealing body segment is moved again towards the recess to enclose the cable into the respective cable entry opening. As part of the cable entry opening is formed in the central sealing body segment, the insertion and appropriate axial positioning of the cable into the cable entry opening necessarily has to be performed at the sealing body. This can make the operation difficult because it requires the operator to handle, besides the cable and the cylinder-segment-like sealing body segment, the entire sealing body which is generally heavy and cumbersome. Moreover, when the sealing body cannot be moved away from the cable sleeve (for example when the sealing body is already coupled to other cables housed in the cable sleeve), the insertion and appropriate axial positioning of the cable into the cable entry opening necessarily has to be performed at the location of the cable sleeve that is generally located in uncomfortable and cramped locations.

The Applicant notes that in the solution disclosed by US 2020/0249407, when a cable has to be coupled to the gel sealing unit, the appropriate gel sealing module—defining a full cable port—has to be removed from between inner and outer pressurization structures of the actuator. Then, the first and second gel portions of the gel sealing module have to be separated from each other to allow the cable to be laterally inserted into the respective cable port. After insertion of the cable into the cable port, the first and second gel portions of the gel sealing module can be moved again towards each other and the gel sealing module can be inserted again, as a whole, between the inner and outer pressurization structures of the actuator. As the gel module is made of two separate gel portions, the cable insertion operation is quite difficult to be performed because it requires the operator to handle three different pieces (the cable and the two separate gel portions) at the same time. Moreover, after the insertion and appropriate axial positioning of the cable into the cable port, the first and second gel portions of the gel sealing module are free to separate from each other as long as the gel sealing module is not inserted again between the inner and outer pressurization structures of the actuator. This requires the operator to accurately keep together the first and second gel portions to maintain the cable inserted into the cable port with the appropriate axial positioning as long as the gel sealing module is not inserted again between the inner and outer pressurization structures of the actuator. Finally, in order to remove or insert a single cable in a gel module it is required to remove the pressurization structures of the actuator, thus it requires to interact with all the sealing modules at the same time.

The Applicant faced the technical problem of providing an alternative solution for a telecommunications enclosure.

In particular, the Applicant faced the technical problem of providing a telecommunications enclosure that enables to improve coupling of a cable to a cable port.

The present disclosure thus relates to a telecommunications enclosure according to claim 1 as well as to a method for coupling a cable to a cable port defined by a sealing assembly of a telecommunications enclosure according to claim 12.

In particular, in a first aspect, the present disclosure relates to a telecommunications enclosure comprising:
  a casing defining an inner cavity for housing a telecommunications module,
  a base adapted to be removably coupled to the casing to close the casing, and
  a plurality of sealing assemblies adapted to be removably coupled to the base,
  wherein:
  each sealing assembly of said plurality of sealing assemblies comprises an elastically deformable sealing module, a first member and a second member, the elastically deformable sealing module being interposed between the first member and the second member, and the elastically deformable sealing module, the first member and the second member defining a respective cable port;
  the first member and second member of each sealing assembly comprise each a main portion and a movable portion, wherein the movable portion is movable between an open position, wherein a cable is allowed to access to the elastically deformable sealing module, and a closed position;
  the elastically deformable sealing module of each sealing assembly has an access to allow the cable to enter the respective cable port when the movable portion of the respective first member and the movable portion of the respective second member are in the open position;
  in the closed position, the movable portion of each first member is coupled to the respective main portion and the movable portion of each second member is coupled to the respective main portion so as to wrap the cable;
  the elastically deformable sealing module of each sealing assembly is held by the main portion of the first member and by the main portion of the second member of the sealing assembly while the respective movable portion of the first member and the respective movable portion of the second member are in the open position;
  the elastically deformable sealing module of each sealing assembly is configured to hold the cable in the respective cable port while at least one of the respective movable portion of the first member and the respective movable portion of the second member is in the open position.

In a second aspect, the present disclosure relates to a method for coupling a cable to a cable port at least partially defined by a sealing assembly of a telecommunications enclosure, wherein the sealing assembly comprises a elastically deformable sealing module interposed between a first member and a second member; wherein the first member and the second member of the sealing assembly comprise each a main portion and a movable portion, the movable portion being movable between an open position and a closed position; and wherein the elastically deformable sealing module is configured to hold the cable in the respective cable port while at least one of the respective movable portion of the first member and the respective movable portion of the second member is in the open position; the method comprising:
  decoupling the sealing assembly from the telecommunications enclosure;
  moving the movable portion of the first member and the movable portion of the second member of the sealing assembly from the closed position to the open position while the elastically deformable sealing module is held by the main portion of the first member and by the main portion of the second member;
  inserting the cable into the cable port through an access defined in the elastically deformable sealing module of the sealing assembly when the movable portion of the first member and the movable portion of the second member are in the open position;
  moving the movable portion of the first member and the movable portion of the second member of the sealing assembly from the open position to the closed position so as to wrap the cable into cable port;
  coupling the sealing assembly to the telecommunications enclosure.

According to the present disclosure, when a cable has to be coupled to a cable port of the telecommunications enclosure, the appropriate sealing assembly, defining a full cable port, can be decoupled from the base of the telecommunications enclosure. The operator is thus enabled to perform the insertion and appropriate axial positioning of the cable into the cable port at the sealing assembly instead of at the base. Moreover, the operator is required to only handle the sealing assembly and not the base as well. As the sealing assembly is more handy and compact with respect to the base and can be moved, for the operation, in a more convenient location with respect to the base and telecommunications enclosure, the cable insertion operation is facilitated.

Once the appropriate sealing assembly is decoupled from the base of the telecommunications enclosure, the movable portion of the first member and the movable portion of the second member of the sealing assembly are moved in the open position to allow the cable to be inserted into the respective cable port through the access in the respective elastically deformable sealing module. After insertion of the cable into the cable port, the movable portion of the first member and the movable portion of the second member are moved again in the closed position to wrap the cable inserted into the respective cable port. Thereafter, the sealing assembly can be coupled again to the base of the telecommunications enclosure.

As the elastically deformable sealing module is held by the main portion of the first member and by the main portion of the second member of the sealing assembly while the movable portions of the first member and second member are in the open position, the elastically deformable sealing module is unaffected (that is, it not separated into two portions) by the movements of said movable portions between the closed position and the open position. The insertion of the cable into the cable port is thus facilitated since the operator is only required to handle two pieces at the same time (the cable and the elastically deformable sealing module entirely held by the respective main portions of the first member and second member).

In the present disclosure and claims, the term "elastically deformable sealing module" is used to indicate a sealing module made of a material which is susceptible to deformation caused by a relative small force and is able to recover the substantially original shape and dimensions after the elimination of the deforming force. For the purpose of the present disclosure, an "elastically deformable element" is made of a material having an elastic modulus E (also known as Young's modulus) less than 0.5 GPa, preferably less than 0.1 GPa.

In the present disclosure and claims, the terms "axial" or "axially", in relation to components of a sealing assembly, are used to indicate elements/magnitudes arranged/measured or extending in a direction substantially parallel to a main development axis of a length of a cable when inserted into a cable port.

In the present disclosure and claims, the terms "radial" and "radially", in relation to components of a sealing assembly, are used to indicate elements/magnitudes arranged/measured or extending in a direction that intersects a main development axis of a length of a cable when inserted into a cable port and that lies in a plane perpendicular to such an axis.

In the present disclosure and claims, the terms "axial" or "axially", in relation to a base and components thereof, are used to indicate elements/magnitudes arranged/measured or extending in a direction substantially parallel to a main development axis of the telecommunications enclosure, In the present disclosure and claims, the terms "radial" and "radially", in relation to a base and components thereof, are used to indicate elements/magnitudes arranged/measured or extending in a direction that intersects a main development axis of the telecommunications enclosure and that lies in a plane perpendicular to such an axis.

In the present disclosure and claims, the terms "circumferential" and "circumferentially", in relation to a base and components thereof, are used to indicate elements/magnitudes arranged/measured or extending along a circumference developing around a main development axis of the telecommunications enclosure.

When a sealing assembly is coupled to a base of a telecommunications enclosure, an axial direction in relation to components of the sealing assembly is parallel to an axial direction in relation to the base and components thereof.

The present disclosure, in at least one of the aforementioned aspects, can be implemented according to one or more of the following embodiments, optionally combined together.

In some embodiments, the elastically deformable sealing module of each sealing assembly is only held by the main portion of the first member and by the main portion of the second member of the sealing assembly while the respective movable portion of the first member and the respective movable portion of the second member are in the open position;

In some embodiments, the elastically deformable sealing module of each sealing assembly is configured to encircle the cable in the respective cable port while at least one of the respective movable portion of the first member and the respective movable portion of the second member is in the open position.

This advantageously facilitates the operator in the cable insertion operation in that the cable remains inserted in the respective cable port even when said movable portions are in the open position and when the sealing assembly is decoupled from the base.

In some embodiments, when the cable is inserted in the respective cable port and at least one of the respective movable portion of the first member and the respective movable portion of the second member is in the open position, the sealing assembly can axially slide with respect to the cable.

In some embodiments, when the cable is inserted in the respective cable port and at least one of the respective movable portion of the first member and the respective movable portion of the second member is in the open position, the sealing assembly can rotate along an axial axis with respect to the cable.

The operator can then comfortably make adjustments to the position of the sealing assembly on the cable before moving the movable portions to the closed position.

In some embodiments, the access of each elastically deformable sealing module is commutable between an open condition during the entering of the cable into the respective cable port and a closed condition.

In some embodiments, the commutations of the access of each elastically deformable sealing module between the open condition and the closed condition and between the closed condition and the open condition are actuated through an elastic deformation of the access.

In some embodiments, the movements of the movable portions of the first member and second member of each sealing assembly between the closed position and the open position do not have any effect on the respective elastically deformable sealing module.

In some embodiments, the movements of the movable portions of the first member and second member of each sealing assembly between the closed position and the open position do not commutate the access of the respective elastically deformable sealing module into the open position.

In some embodiments, each sealing assembly comprises a pressure element adapted to compress the elastically deformable sealing module between the respective first member and second member.

In some embodiments, the pressure element is adapted to axially compress the elastically deformable sealing module between the respective first member and second member.

This advantageously enables to improve the sealing of the cable in the respective cable port.

In some embodiments, the pressure element comprises a screw tightener.

In some embodiments, the main portion and the movable portion of the first member of each sealing assembly are hinged to each other at respective hinged ends.

In this way, in the open position, the movable portion can be moved away from the main portion even though they are still connected by a hinge. This advantageously enables the operator to handle the sealing assembly as a single piece even when the movable portion is in the open position.

In some embodiments, the main portion and the movable portion of the first member of each sealing assembly comprise respective free ends adapted to engage with each other in a removable manner, for example through a shape coupling or a snap coupling.

In some embodiments, the main portion and the movable portion of the second member of each sealing assembly are hinged to each other at hinged ends.

In this way, in the open position, the movable portion can be moved away from the main portion even though they are still connected by a hinge. This advantageously enables the operator to handle the sealing assembly as a single piece even when the movable portion is in the open position.

In some embodiments, the main portion and the movable portion of the second member of each sealing assembly comprise respective free ends adapted to engage with each other in a removable manner, for example through a shape coupling or a snap coupling.

In some embodiments, the movable portion of the first member and the movable portion of the second member of each sealing assembly are adapted to move between the open position and the closed position independently from each other.

In some embodiments, each sealing assembly is adapted to be individually and separately coupled to and decoupled from the base.

In some embodiments, the base comprises a retaining body adapted to hold the plurality of sealing assemblies.

In some embodiments, the retaining body comprises a plurality of recesses adapted to receive the plurality of sealing assemblies.

In some embodiments, each sealing assembly is adapted to be individually and separately inserted into and removed from the respective recess.

In some embodiments, each sealing assembly is axially inserted into and removed from the respective recess.

In some embodiments, each sealing assembly is retained in the respective recess by friction provided by the respective elastically deformable sealing module when the elastically deformable sealing module is compressed between the respective first member and second member.

In some embodiments, each sealing assembly comprises a coupling element adapted to removably fix the sealing assembly to the respective recess.

In some embodiments, the retaining body comprises a plurality of radial projections, each recess of the plurality of recesses being formed between two circumferentially consecutive projections.

In some embodiments, for each recess, the retaining body comprises a strengthen element coupled to two circumferentially consecutive projections.

This advantageously enables the two circumferentially consecutive projections to be connected by the strengthen element, so that the strengthen element realizes a bridge between the two circumferentially consecutive projections. This prevents the two circumferentially consecutive projections from elastically deforming and diverging from each other when the elastically deformable sealing module exerts forces against the two circumferentially consecutive projections for being frictionally retained in the recess.

In some embodiments, each strengthen element is configured to radially block a sealing assembly in the respective recess.

In some embodiments, each strengthen element is movable between an open position and a closed position wherein the respective sealing assembly is prevented from radially move with respect to the recess.

In some embodiments, each strengthen element is hinged to one projections of two circumferentially consecutive projections of the plurality of radial projections and is removably coupled to the other projections of the two circumferentially consecutive projections, for example through a snap coupling or a shape coupling.

In some embodiments, at least one of the first member and the second member of each sealing assembly comprises engagement members adapted to engage corresponding engagement members respectively defined in the two circumferentially consecutive projections forming the respective recess.

In some embodiments, the engagement members of the sealing assembly engage the engagement members of the retaining body when the sealing assembly is retained in the respective recess.

In some embodiments, the engagement members of the sealing assembly engage the engagement members of the retaining body so as to circumferentially couple the sealing assembly to two circumferentially consecutive projections.

This advantageously enables two circumferentially consecutive projections to be circumferentially connected by the first member or the second member, so that the first member or the second member realizes a bridge between the two circumferentially consecutive projections. This prevents the two circumferentially consecutive projections from elastically deforming and diverging from each other when the elastically deformable sealing module exerts forces against the two circumferentially consecutive projections for being frictionally retained in the recess.

In some embodiments, each radial projection comprises a circumferential sealing segment.

In some embodiments, the circumferential sealing segment of each radial projection is made of an elastomeric material, for example a gel-like material.

In some embodiments, the circumferential sealing segment of each radial projection has two opposite circumferential ends counter-shaped to corresponding portions respectively defined in two circumferentially adjacent elastically deformable sealing modules of the sealing assemblies, so as to define a continuous sealing between the radial projection and the two circumferentially adjacent elastically deformable sealing modules.

This advantageously enables to obtain a continuous seal along the perimeter of the base when the sealing assemblies are inserted into the respective recesses of the retaining body.

In some embodiments, each elastically deformable sealing module is made of a single piece of material.

In some embodiments, the elastically deformable sealing module of each sealing assembly is axially interposed between the respective first member and the respective second member.

In some embodiments, the elastically deformable sealing module of each sealing assembly has a slit forming said access to allow the cable to enter the respective cable port.

In some embodiments, the access of the elastically deformable sealing module of each sealing assembly is configured to allow the cable to radially enter the respective cable port.

In some embodiments, the elastically deformable sealing module is made of a gel-like material or an elastomeric material, such as for example a 30 shore rubber or 20 shore silicon.

In some embodiments, the first member of each sealing assembly is rigid.

In some embodiments, the second member of each sealing assembly is rigid.

In some embodiments, the base comprises connections to the telecommunications module.

In some embodiments, the casing has an elongated shape developing along a main development axis.

In some embodiments, the casing has a generally cylindrical hollow shape.

In some embodiments, the casing has an opening at a first end thereof, the opening being adapted to be closed by the base.

In some embodiments, the casing has a closed end wall at a second end opposite to the first end, In some embodiments, the closed end wall is dome-shaped or generally rounded.

In some embodiments, when the plurality of sealing assemblies is coupled to the base, they form with the base a disc shaped body.

In some embodiments, the base is adapted to be coupled to the casing by means of a circular clamp.

In some embodiments, the telecommunications enclosure comprises a circular clamp to couple the base to the casing.

In some embodiments, decoupling the sealing assembly from the telecommunications enclosure comprises decoupling the base from the casing.

In some embodiments, decoupling the sealing assembly from the telecommunications enclosure comprises decompressing the elastically deformable sealing module by reducing the pressure between the first member and the second member.

In some embodiments, it is provided extracting a cable from the cable port through the access defined in the elastically deformable sealing module of the sealing assembly when the movable portion of the first member and the movable portion of the second member are in the open position.

In some embodiments, inserting the cable into the cable port through the access comprises elastically deforming the elastically deformable sealing module.

In some embodiments, extracting the cable from the cable port through the access comprises elastically deforming the elastically deformable sealing module.

In some embodiments, coupling the sealing assembly to the telecommunications enclosure comprises coupling the sealing assembly to the base.

In some embodiments, coupling the sealing assembly to the base comprises inserting the sealing assembly in a recess of the base.

In some embodiments, coupling the sealing assembly to the telecommunications enclosure comprises coupling the base to the casing.

The features and advantages of the present disclosure will be made apparent by the following detailed description of some exemplary embodiments thereof, provided merely by way of non-limiting examples, description that will be conducted by making reference to the attached drawings, wherein.

DETAILED DESCRIPTION

Figure 1:
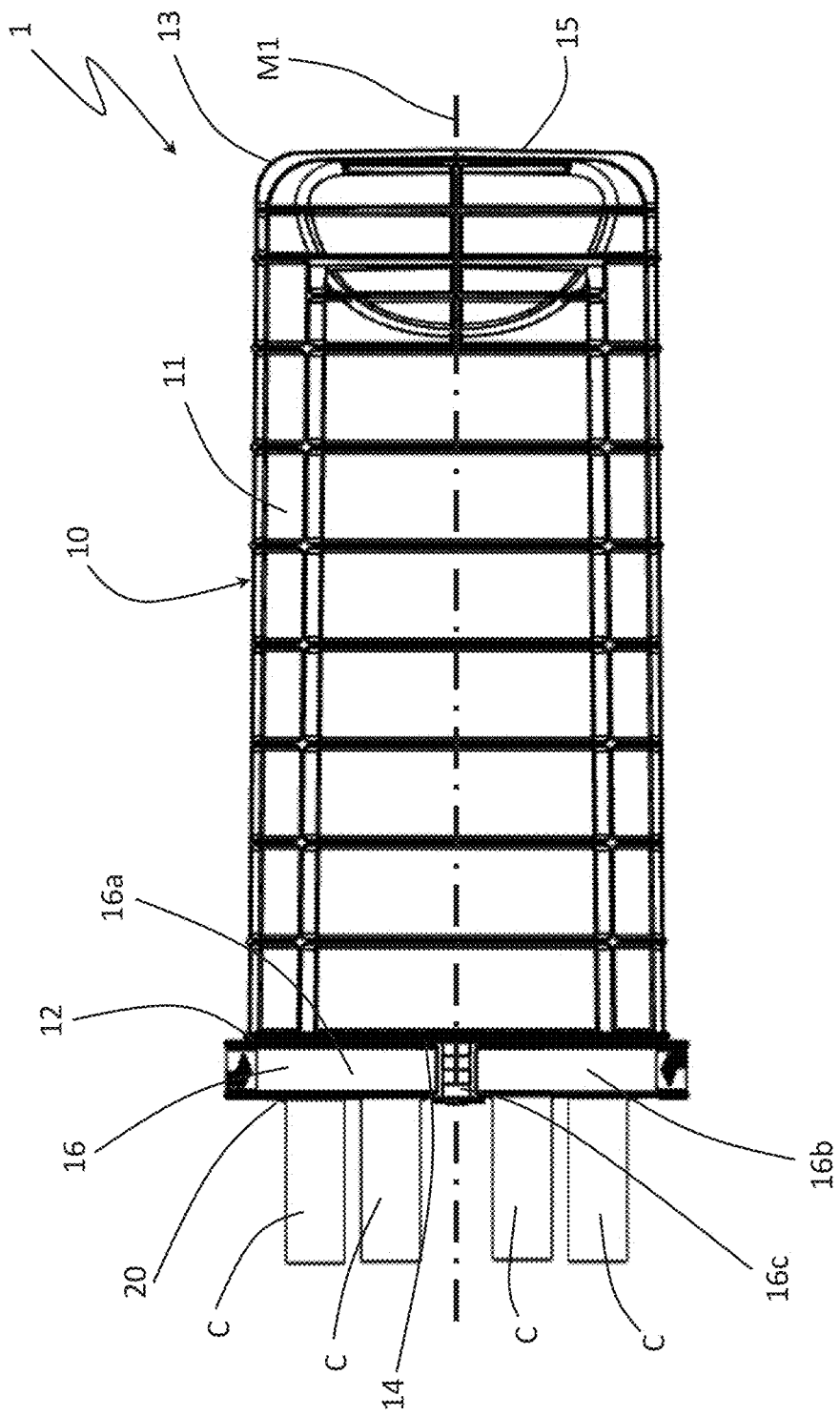
FIG. 1 shows a side view of a telecommunications enclosure according to the present invention.

A telecommunications enclosure according to the present invention is indicated with the reference number 1 in FIG. 1.

The telecommunications enclosure 1 has a first main development axis M1 and comprises a casing 10, The casing 10 may have a generally cylindrical hollow shape.

In the embodiment shown in FIG. 1, the casing 10 comprises a cylindrical wall 11 which extends substantially cylindrically around the first main development axis M1 between a first end 12 and a second end 13. At the first end 12, the casing 10 comprises an opening 14. At the second end 13, the casing 1 comprises a closed end wall 15.

The closed end wall 15 of the casing 10 may be dome-shaped or may have generally rounded edges.

The casing 10 defines an inner cavity extending along the first main development axis M1. The inner cavity is delimited by the cylindrical wall 11 between the opening 14 and the end wall 15 and is open at the opening.

The casing 10 is configured for housing a telecommunications module (not shown).

The telecommunications module may comprise, for example, telecommunications components (not shown) such as splices, termination panels, power splitters and wavelength division multiplexers.

Generally, the telecommunications module comprises a plurality of splice trays for storing and splicing optical fibers of optical cables. Storage areas may be provided upstream the splice area to store extra-length portions of the optical fibers which are actually used as well as to store optical fibers which are not used. The telecommunications module may further comprise routing elements, namely transportation tubes or routing channels, for suitably directing optical fibers, which may be grouped in fiber modules, which enter and exit the telecommunications enclosure 1, towards the splice trays and away from the splice trays.

Figure 2:
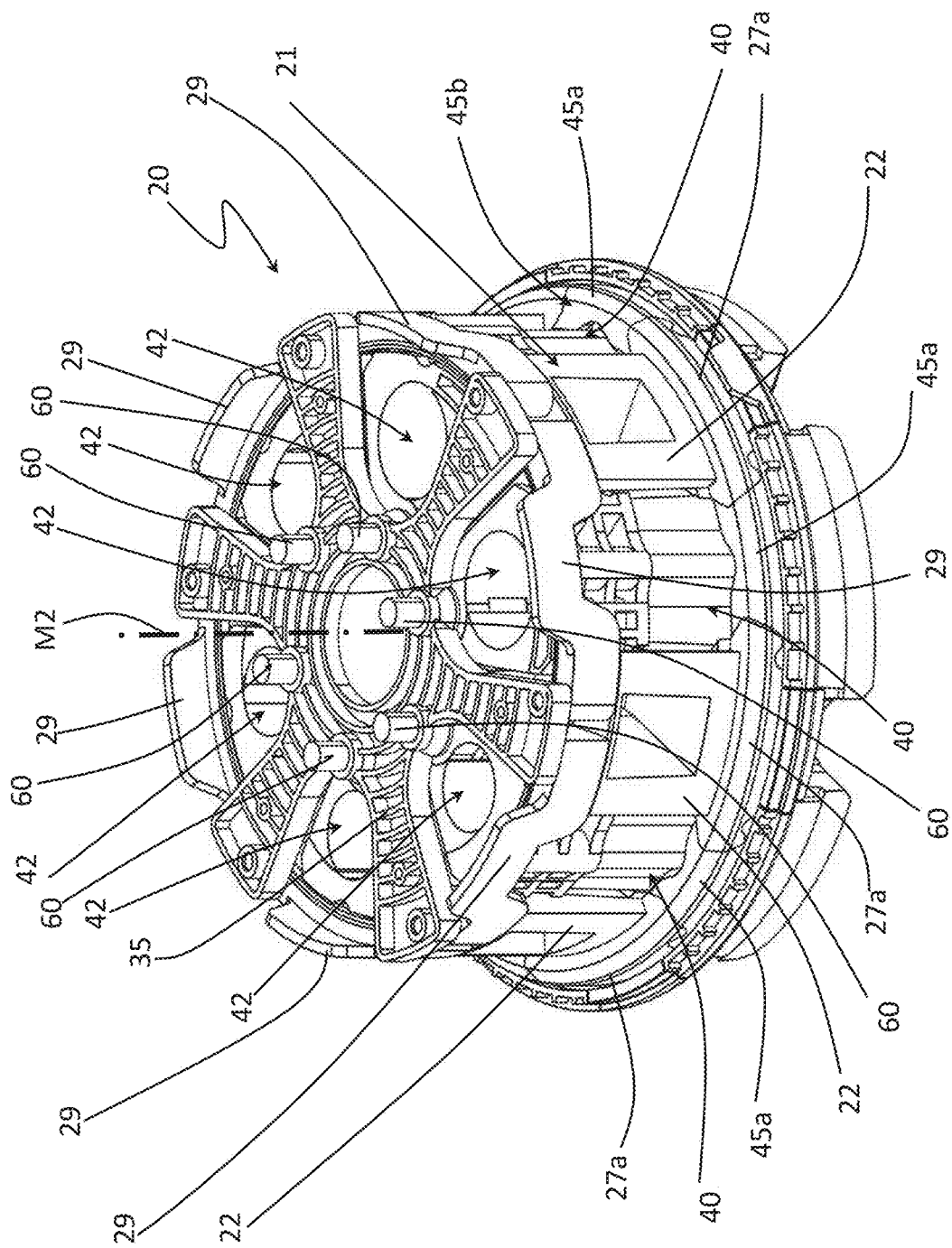
FIG. 2 shows a perspective view of components of the telecommunications enclosure of FIG. 1.
Figure 4:
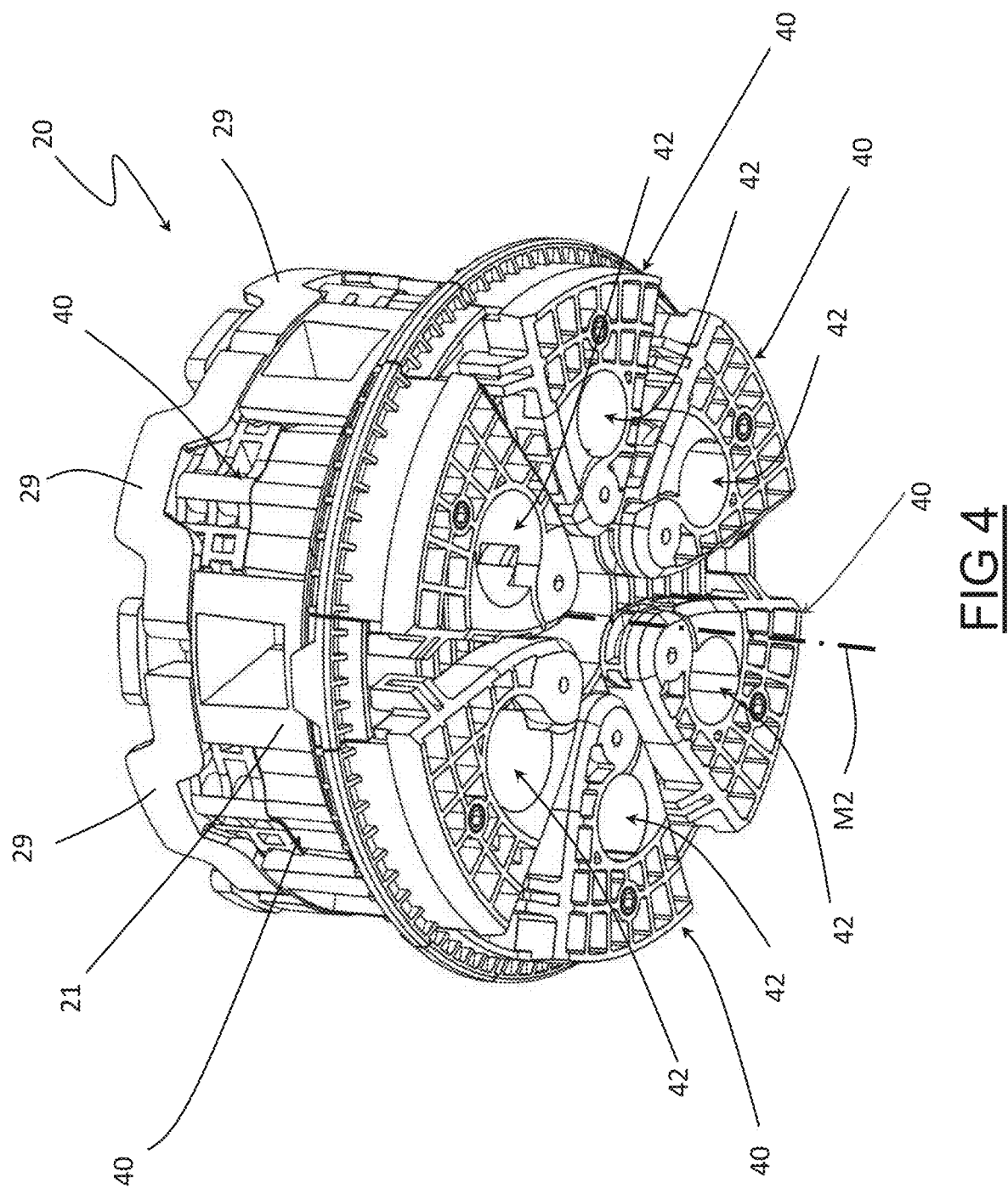
FIG. 4 shows a perspective view from a different angle of the components of FIG. 2.

The telecommunications enclosure 1 further comprises a base 20, shown in detail in FIG. 2 and FIG. 4. The base 20 has a second main development axis M2. In the illustrated embodiment, the second main development axis M2 is an axis of symmetry of the base 20.

The base 20 is adapted to be removably coupled to the casing 10 at the opening 14 to close the inner cavity. In the embodiment of FIG. 1, the base 20 can be partially inserted in the inner cavity of the casing 10 for removably coupling to the latter. When the base 20 is coupled to the casing, the second main development axis M2 coincides with the first main development axis M1. A circular clamp 16 may be provided to couple the base 20 with the casing 10.

The circular clamp 16 comprises a first semicircular sleeve 16a and a second semicircular sleeve 16b hinged to each other through a pin 16c. The first semicircular sleeve 16a and the second semicircular sleeve 16b have a respective free end at a position circumferentially opposite to the pin 16c. A closure (not shown) acts on said free ends between a close position wherein the free ends of the first semicircular sleeve 16a and of the second semicircular sleeve 16b are close to each other and a open position wherein the free ends of the first semicircular sleeve 16a and of the second semicircular sleeve 16b are spaced apart to each other. In the close position the circular clamp 16 clamps the base 20 and the casing 10 so as to firmly couple the base 20 and the casing 10. In the open position the clamp 16 does not clamp the base 20 and the casing 10 so allowing the base 20 to be separated from the casing 10.

Figure 5:
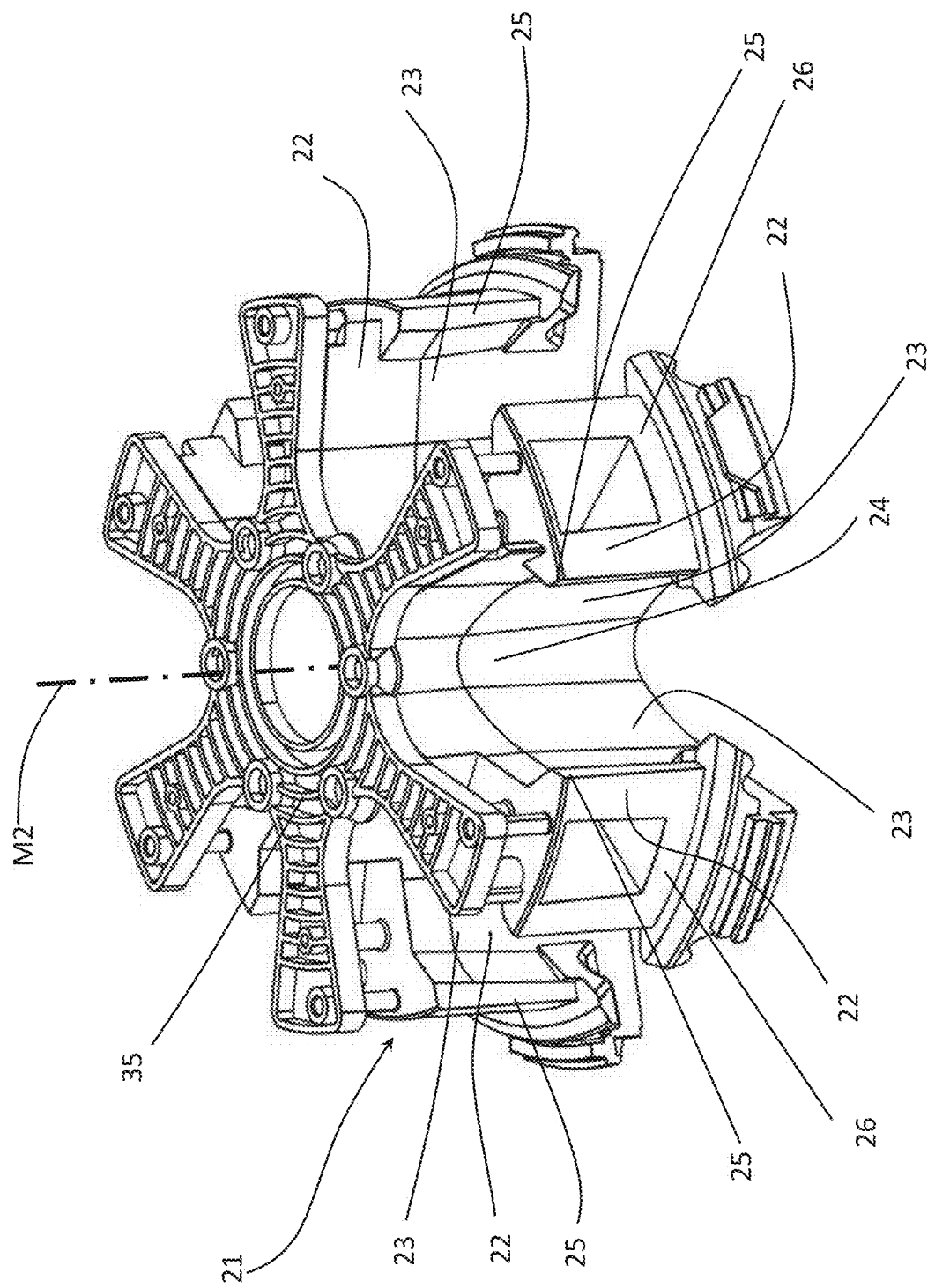
FIG. 5 shows a perspective view of components of the telecommunications enclosure of FIG. 1.

The base 20 comprises a retaining body 21, illustrated in detail in FIG. 5. The retaining body 21 extends around the second main development axis M2 and is rotationally symmetric with respect to it.

The retaining body 21 comprises a plurality of radial projections 22 which extend radially with respect to the second main development axis M2. The radial projections 22 are circumferentially distributed around the second main development axis M2. The retaining body 21 comprises evenly distributed radial projections 22 identical to each other.

Each radial projection 22 has two opposite lateral surfaces 23. Each lateral surface 23 extends from a respective radially inner end 24 to a radially outer end 25. The lateral surfaces 23 extend substantially parallel to the second main development axis M2.

Each radial projection 22 comprises an end surface 26. The end surface 26 is placed at the radially outer ends 25 of the two lateral surfaces 23. The radial projection 22 joins the two lateral surfaces 23.

Each end surface 26 has a substantially semi-cylindrical shape so that all the end surfaces 26 are aligned along an ideal common cylindrical surface. The end surfaces 26 are configured to fit into the inner cavity of the casing 10, substantially in contact with the cylindrical wall 11 of the casing 10.

Two circumferentially consecutive radial projections 22 have a respective abutment 27, wherein the two abutments 27 project circumferentially in opposite directions and face to each other. Each abutment 27 is located at a radially outer end 25. Each abutment 27 extends in a circumferentially direction from a respective end surface 26. From any end surface 26 extend two abutments 27 in opposite circumferentially directions. Each lateral surface 23 extends radially inward from a respective abutment 27.

Each radial projection 22 may comprise a circumferential sealing segment 27a. The circumferential sealing segment 27a has an arched shape which follows the shape of the cylindrical wall 11 of the casing 10 at the opening.

In the illustrated embodiment, each circumferential sealing segment 27a circumferentially extends between two opposite ends 27b. Each circumferential sealing segment 27a radially projects away from the end surface 26. The opposite ends 27a of each circumferential sealing segment 27a circumferentially extend away from the end surface 26, so that the circumferential sealing segments 27a of two circumferentially consecutive radial projections 22 project towards each other. The circumferential sealing segments 27a are made of an elastomeric material, for example a gel-like material.

Figure 6:
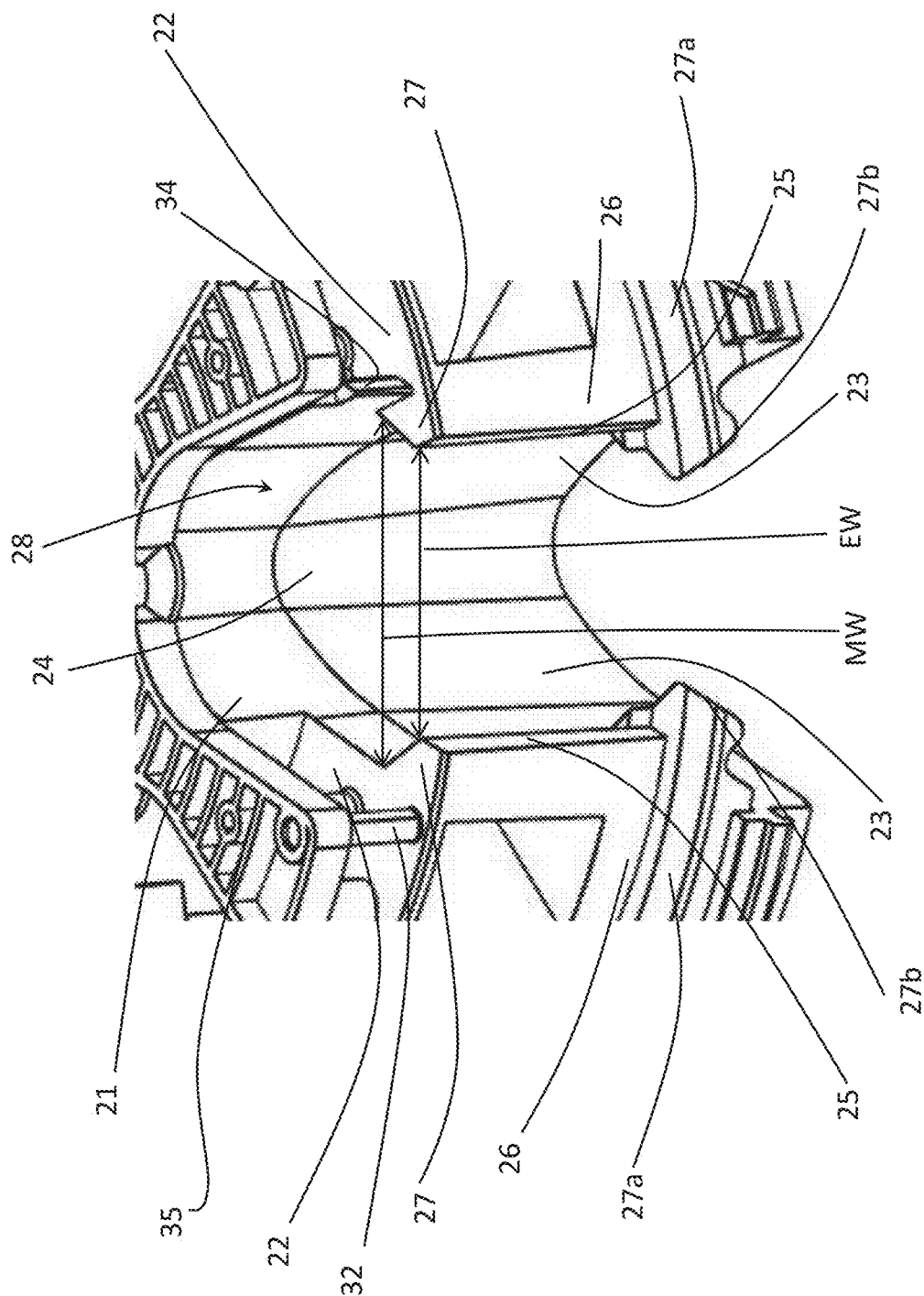
FIG. 6 shows a detail of the components of FIG. 5.

The retaining body 21 comprises a plurality of recesses 28, which are circumferentially distributed around the retaining body 21. FIG. 6 shows in detail one of the recess 28. Each recess 28 is defined between two circumferentially consecutive radial projections 22. In the illustrated embodiment, the retaining body 21 has six evenly distributed recesses 28.

Each recess 28 is delimited by two lateral surfaces 23 facing each other of two circumferentially consecutive radial projections 22 and radially extends from the radially inner ends 24 of the two lateral surfaces 23 to their radially outer ends 25.

The circumferential extent of each recess 28, measured in the circumferential direction, gradually increases in the radial direction from the radially inner ends 24 to the radially outer ends 25. The circumferential extent of each recess 28 has a maximum value MW at the radially outer ends 25 at a position close and radially inner to the abutments 27, as illustrated on FIG. 6. From the maximum value MW, the circumferential extent of each recess 28 decreases in correspondence of two abutments 27 to an end value EW. The end value EW coincides with the distance between two facing abutments 27.

Figure 3:
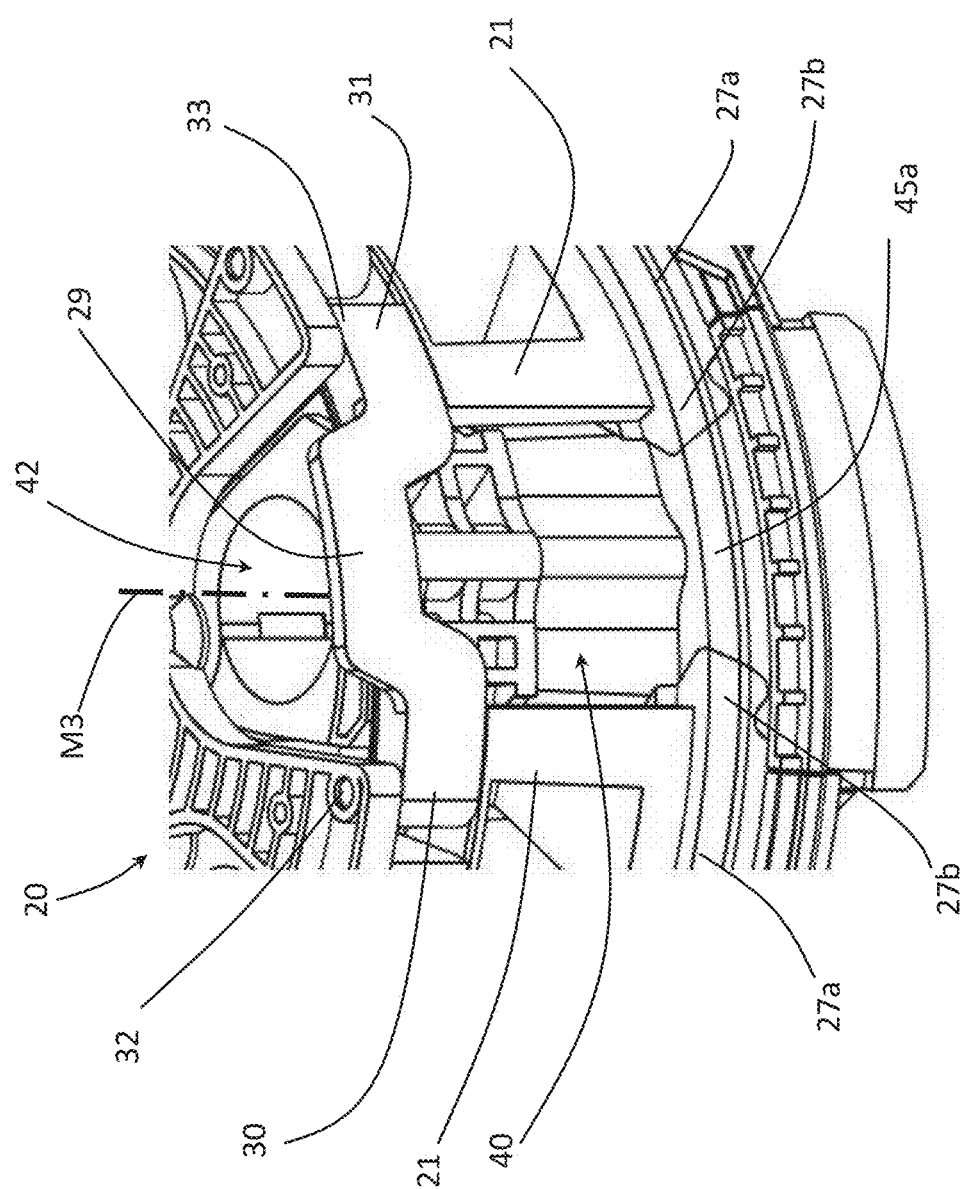
FIG. 3 shows a detail of the components of FIG. 2.

For each recess 28, the base 20 comprises a strengthen element 29 coupled to two circumferentially consecutive radial projections 22 forming the recess 28. The strengthen elements 29 are shown in FIGS. 2, 3 and 4 and are not illustrated in FIGS. 5 and 6.

Each strengthen element 29 extends from a first end 30 to a second end 31 thereof. In the illustrated embodiment, each strengthen element 29 is an elongated body which is curved so as to follow the curvature of the end surfaces 26.

At its first end 30, the strengthen element 29 is hinged to one of the two respective circumferentially consecutive radial projections 22 at a hinge 32.

At its second end 31, the strengthen element 29 comprises a coupling portion 33 configured to engage an anchoring portion 34 which is mounted on, or part of, the other one of the two respective circumferentially consecutive radial projections 22. In the illustrated embodiment, the coupling portion 33 is removably fixable to the anchoring portion 34, through a dove-tail shape coupling or another form of shape coupling.

Each strengthen element 29 is movable between a closed position and an open position around the hinge 32.

In the closed position, shown in FIG. 3, the coupling portion 33 is fixed to the anchoring portion 34 and the strengthen element 29 extends between the two circumferentially consecutive radial projections 22 across the respective recess 28. The strengthen element 29 connects the two circumferentially consecutive radial projections 22 in a bridge-like configuration and is configured to provide rigidity to the retaining body 21 and to prevent deformations of the radial projections 22 when a circumferentially oriented force is applied to their lateral surfaces 23.

In the closed position, the strengthen elements 29 are aligned to the ideal common cylindrical surface cylinder to which the end surfaces 26 are aligned, so that the strengthen elements 29 can housed within the casing 10. In the illustrated embodiment, the strengthen elements 29 in the closed position can be housed in the cavity of the casing 10 against the cylindrical wall 11.

In the open position of the strengthen elements 29, the strengthen element 29 prevents, at least partially, accessing to the respective recess 28.

In the open position of the strengthen element 29, not shown in the attached figures, the coupling portion 33 is not engaged in the anchoring portion 34 and the strengthen element 29 allows accessing to the respective recess 28.

The base 20 comprise a holding body 35, which is mounted on the retaining body 21, arranged next to the retaining body 21 along the second main development axis M2. In the illustrated embodiment the holding body 35 substantially follows the profile of the retaining body 21 on a plane orthogonal to the second main development axis M2. The holding body 35 is connected to the hinges 32 so that each hinge 32 extends from the retaining body 21 to the holding body 35. The holding body 35 is configured to withstand part of the mechanical loads going through the hinges 32.

The holding body 35 may be integral with the retaining body 21.

Figure 7:
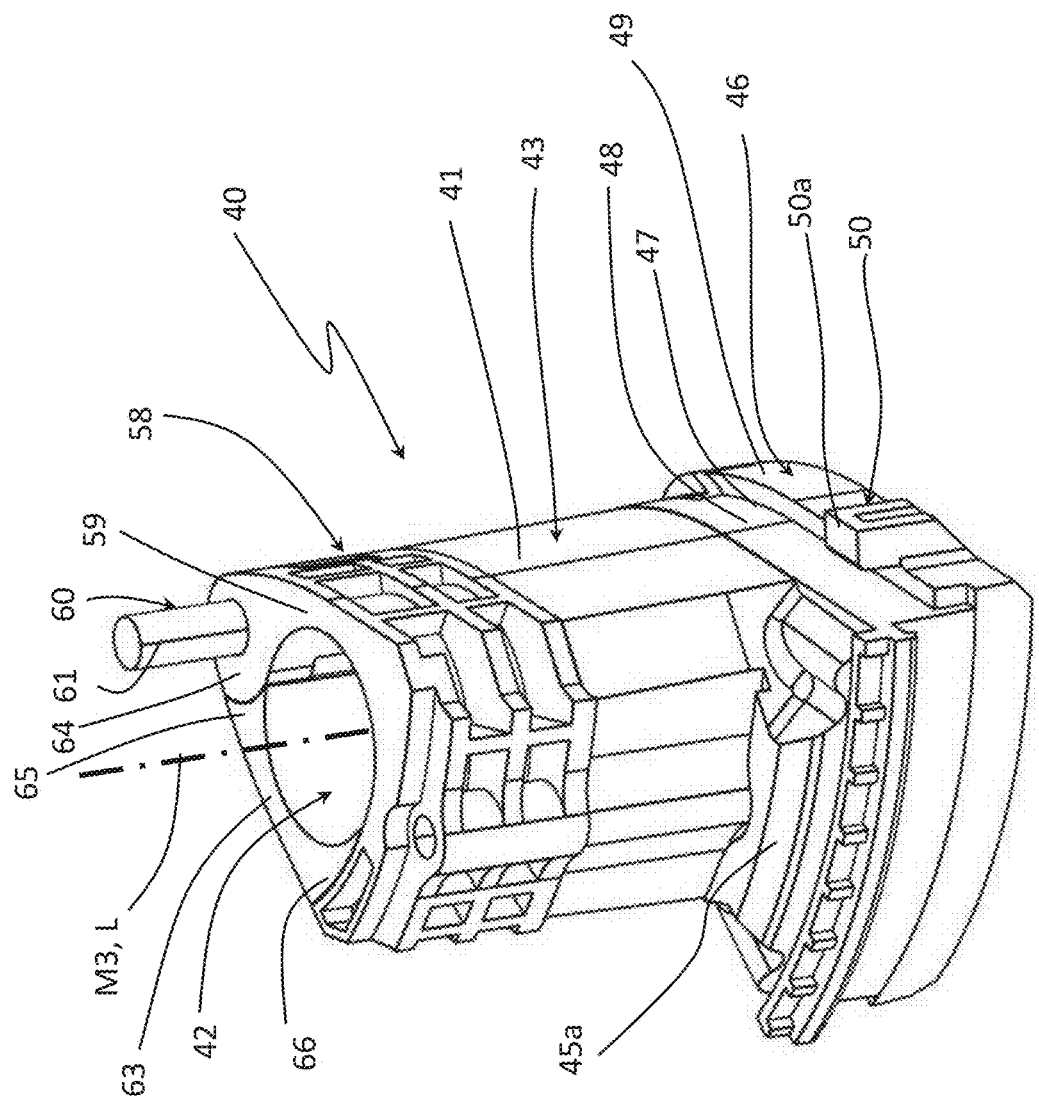
FIG. 7 shows a perspective view of a sealing assembly of the telecommunications enclosure of FIG. 1.
Figure 8:
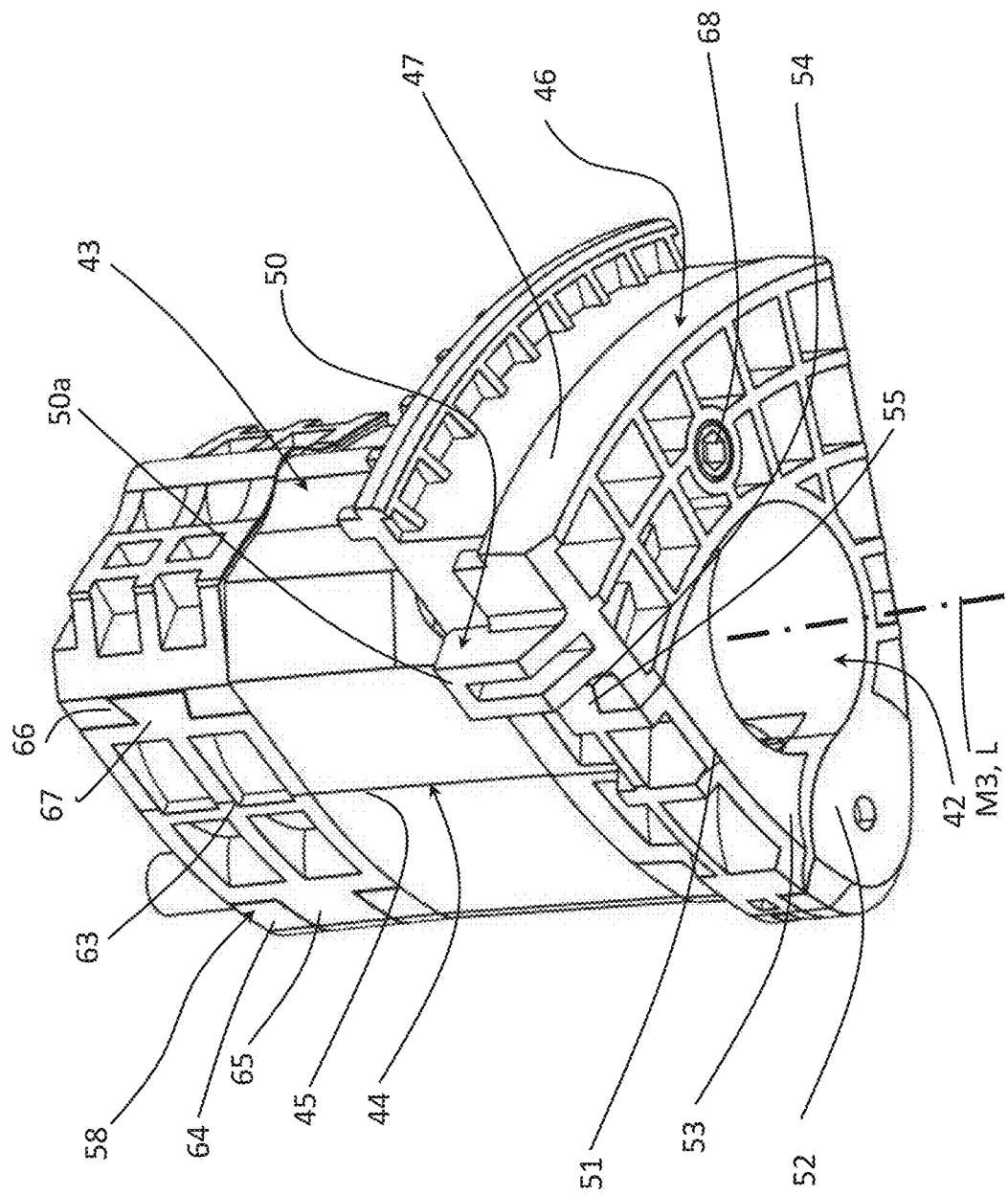
FIG. 8 shows a perspective view from a different angle of the sealing assembly of FIG. 7.
Figure 9:
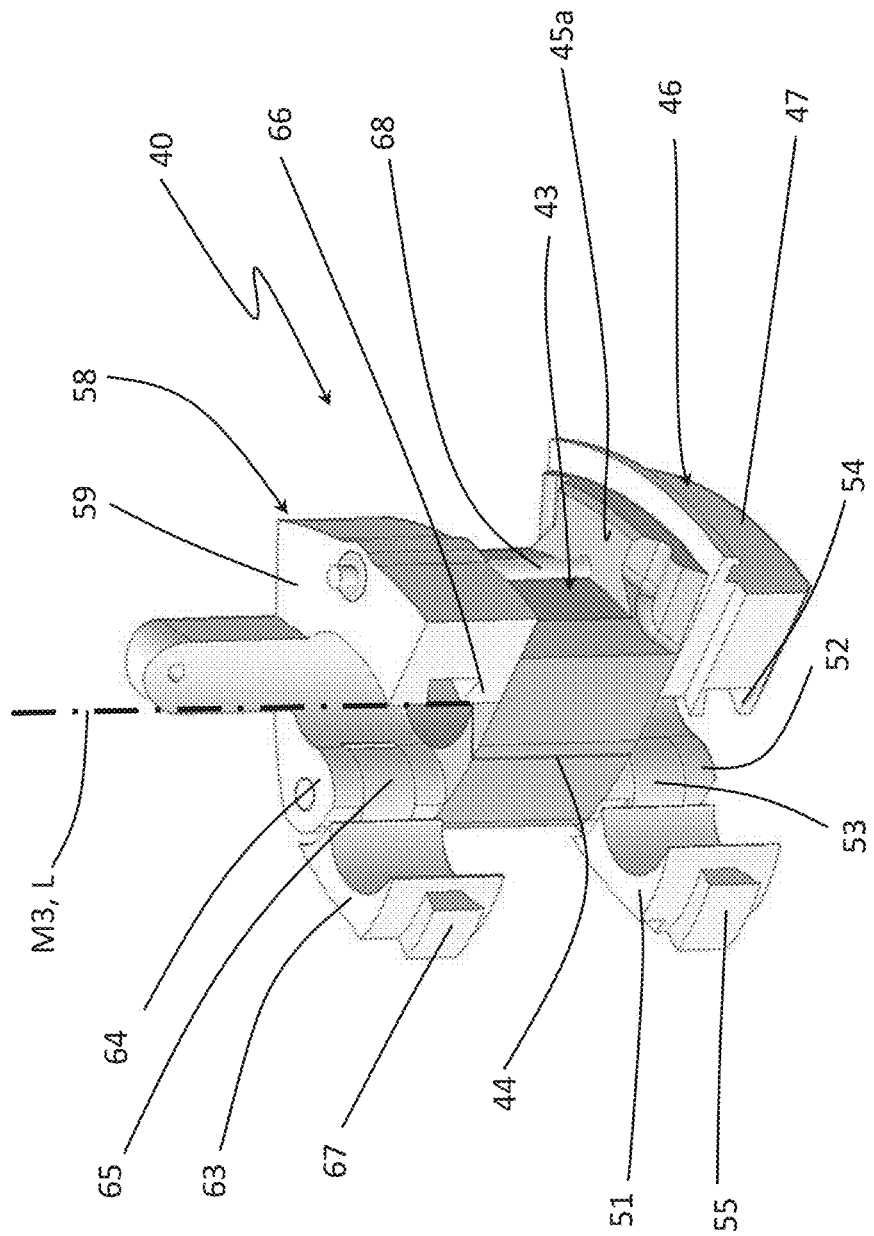
FIG. 9 shows of a different embodiment of a sealing assembly of a telecommunications enclosure according to the present invention.

The telecommunication enclosure 1 comprises a plurality of sealing assemblies 40 illustrated in detail in FIGS. 7 and 8. FIG. 9 shows a sealing assembly 40 in a different embodiment.

The sealing assemblies 40 are adapted to be removably coupled to the base 20. Each sealing assembly 40 is adapted to be individually and separately coupled into a respective recess 28 of the retaining body 21 and decoupled from the respective recess 28 of the retaining body 21.

Each sealing assembly 40 is substantially counter shaped to a respective recess 28 of the retaining body 21. The recesses 28 are adapted to receive and retain the sealing assemblies 40.

Each sealing assembly 40 extends along a longitudinal axis L.

Each sealing assembly 40 has two lateral surfaces 41 adapted to abut against the lateral surfaces 23 of the radial projections 22 when the sealing assembly 40 is housed the respective recess 28.

When the sealing assemblies 40 are housed in the recesses 28, the retaining body 21 and the sealing assemblies 40 together form a substantially disc-like shape adapted to be partially housed in the opening 14 of the casing 10.

The sealing assembly 40 can be inserted in the recess 28 either when the respective strengthen element 29 is in the open position and in the closed position.

The plurality of sealing assemblies 40 and the plurality of recesses 28 are configured so that the sealing assemblies 40 can be axially inserted into and axially removed from the recesses 28. When a sealing assembly is inserted into a respective recess 28, the abutments 27 of the radial projections 22 prevent the sealing assemblies 40 from moving in the radial direction and allow the sealing assemblies 40 to slide in the axial direction within the recess 28.

Each sealing assembly 40 partially defines a cable port 42 through which a cable C, for example a fiber optic cable, can be inserted.

The cable port 42 has a main development axis M3, which coincides with a central axis of a cable C inserted in the cable port 42. In the illustrated embodiment the main development axis M3 coincides with the longitudinal axis L of the sealing assembly 40.

When the sealing assemblies 40 are coupled to the base 20 and the base 20 is coupled to the casing 10, the cable port 42 allows passage of the cable C through the opening of the cavity of the casing 10.

Each sealing assembly 40 comprises an elastically deformable sealing module 43 made of a gel-like material or an elastomeric material, such as for example a rubber material. Each elastically deformable sealing module 43 is made in a single piece.

The elastically deformable sealing module 43 has an access 44 for the insertion and removal of a cable C. In the illustrated embodiment, the access 44 has the form of a slit 45 extending along the main development axis M3 from the top to the bottom of the elastically deformable sealing module 43. The access 44 is formed in the elastically deformable sealing module 43 in the lateral surface 41 thereof. In the illustrated embodiment, the access 44 crosses the whole length of the elastically deformable sealing module 43 in the axial direction.

The access 44 of each elastically deformable sealing module is commutable between an open condition and a closed condition by elastic deformation of the elastically deformable sealing module 43 in correspondence of the access 44.

In the open position, not shown in the attached figures, the access 44 allows a cable C to be inserted in the cable port 42 in the radial direction. In the open position the access 44 can be widened enough (without breaking the elastically deformable sealing module 43) to allow the cable C to by the access 44.

The access 44 is configured to commute from the closed position to the open position when a cable is manually pressed against the access 44 in the radial direction.

The access 44 is configured to return to the closed position following the insertion in or extraction from the cable port 42 of a cable C through the access 44 by the elastic return of the elastically deformable sealing module 43, In the closed position of the access 44, show in FIGS. 7, 8 and 9, the elastically deformable sealing module 43 encircles and wraps the cable C in the cable port 42.

The elastically deformable sealing module 43 comprises a sealing portion 45a. In the illustrated embodiment, the sealing portion 45a is integral with the rest of the elastically deformable sealing module 43 and made of the same material. The sealing portion 45a is provided (or is integral with) on a lateral surface of the elastically deformable sealing module 43 other than the lateral surface 41 of the elastically deformable sealing module 43 provided with the access 44.

The circumferential sealing segments 27a of the radial projections 22 and the sealing portions 45a of the sealing assemblies 40 are counter-shaped to each other and configured to engage to each other when the sealing assemblies 40 is inserted in the respective recesses 28 in order to define a continuous sealing 45b around the base 20. The continuous sealing 45b has a circular shape and is configured to engage the cylindrical wall 11 of the casing 10 in order to seal the opening 14 when the base 20 is coupled with the casing 10.

Each sealing assembly 40 comprises a first member 46 arranged next to the elastically deformable sealing module 43 along the third main development axis M3. The components of the first member 46 are at least predominantly made of rigid material(s), such as plastic (for example Polypropylene or Nylon) or metal. The first member 46 partially defines the cable port 42 of the sealing assembly 40.

The first member 46 comprises a main portion 47 permanently connected to the elastically deformable sealing module 43. The main portion 47 is held to the elastically deformable sealing module 43 in a substantially fixed position with respect to the cable port 42.

In the embodiment of FIGS. 7 and 8, the main portion 47 comprises a first part 48 configured to fit within the respective recess 28. The first part 48 is configured to match the lateral surface 23 of the recess 28 when the sealing assembly 40 is inserted in the recess 28. The main portion 47 further comprises a second part 49 which extends axially away from the first part 48 on the opposite side with respect to the elastically deformable sealing module 43. The second part 49 has a footprint which is larger than the cross-section of the recess 28 and is configured to axially project outside of the recess 28 when the sealing module 40 is inserted in the recess 28.

In the embodiment of FIG. 7 and FIG. 8, the main portion 47 of the first member 46 further comprises two engagement members 50 configured to engage corresponding engagements members of the retaining body 21 in order to removably couple the sealing assembly 40 to the retaining body 21.

Each engagement member 50 comprises a tooth 50a which extends in an axial direction that is configured to enter into a seat defined by the corresponding engagement member of the retaining body 21. Such a seat may be for example defined between internal ribs of the structure of the radial projection 28.

The two engagement members 50 are configured to engage the retaining body 21 during the axial insertion of the sealing assembly 40 in the corresponding recess 28 and to axially hold the sealing assembly 40 to the retaining body 21. Furthermore, the engagement members 50 are configured to rigidly connect two circumferentially consecutive radial projections 22.

The first member 46 further comprises a movable portion 51 coupled to the main portion 47.

The main portion 47 and the movable portion 51 are hinged at respective hinged ends 52, 53 around a pivot axis parallel to an axial direction so that the movable portion 51 can rotate with respect to the main portion 47.

The main portion 47 and the movable portion 51 comprise respective free ends 54, 55 adapted to engage with each other in a removable manner, for example through a shape coupling or a snap coupling. In the illustrated embodiments, the free ends 54, 55 comprise a dove-tail coupling.

The movable portion 51 is movable with respect to the main portion 47 between a closed position, shown in FIGS. 7 and 8 and an open position, shown in FIG. 9, In the closed position, the free ends 54, 55 of the main portion 47 and the movable portion 51 are coupled to each other. In particular, in the closed position, the free ends 54, 55 of the main portion 47 and the movable portion 51 are reversibly fixed to each other. The movable portion 51 and the main portion 47, when the movable portion is in the closed position, surround the cable port 42 and are configured to surround a cable inserted in the cable port.

In the open position, the free ends 54, 55 of the main portion 47 and the movable portion 51 are disengaged from each other and the movable portion 51 allows access to the cable port 42 from a radial direction. In the open position of the movable portion 51 a passage for accessing the cable port is formed.

The movable portion 51 is located at a side of the sealing assembly 40 where the access 44 is provided, so that when the movable portion 51 is in the open position the access 44 can be reached.

Each sealing assembly 40 comprises a second member 58 arranged next to the elastically deformable sealing module 43 along the third main development axis M3 on the opposite side with respect to the first member 46. The elastically deformable sealing module 43 is axially interposed between the first member 46 and the second member 58.

The components of the second member 58 are at least predominantly made of rigid material(s), such as plastic (for example Polypropylene or Nylon) or metal. The second member 58 partially defines the cable port 42 of the sealing assembly 40.

The cable port 42 is defined by the first member 46, the elastically deformable sealing module 43 and the second member 58.

The second member 58 comprises a main portion 59 permanently connected to the elastically deformable sealing module 43. The main portion 59 is held on the elastically deformable sealing module 43 in a substantially fixed position with respect to the cable port 42.

The main portion 59 is configured to fit within the recess 28 when the sealing assembly is inserted in the recess 28.

The main portion 59 is configured to match the lateral surface 23 of the recess 28 when the sealing assembly 40 is inserted in the recess 28.

The main portion 59 of the second member 58 comprises a holding portion 60 configured to reversibly engage the holding body 35 for holding the sealing assembly 40 in the corresponding recess 28. In the illustrated embodiment, the holding portion comprises an axial pin 61 configured to engage a hole 62 in the holding body 35.

The sealing assembly 40 of FIG. 9 differs from the sealing assembly 40 of FIGS. 7 and 8 in that it lacks the holding portion 60 and the engagement members 50.

The second member 58 comprises a movable portion 63 coupled to the main portion 59.

The main portion 59 and the movable portion 63 are hinged at respective hinged ends 64, 65 around a pivot axis parallel to an axial direction so that the movable portion 63 can rotate with respect to the main portion 59.

The main portion 59 and the movable portion 63 comprise respective free ends 66, 67 adapted to engage to each other in a removable manner, for example through a shape coupling or a snap coupling. In the illustrated embodiments, the free ends 66, 67 comprise a dove-tail coupling.

The movable portion 63 is movable with respect to the main portion 59 between a closed position, shown in FIGS. 7 and 8 and an open position, shown in FIG. 9.

In the closed position, the free ends 66, 67 of the main portion 59 and the movable portion 63 are coupled to each other. In particular, in the closed position, the free ends 66, 67 of the main portion 59 and the movable portion 63 are reversibly fixed to each other. The movable portion 63 and the main portion 59, when the movable portion 63 is in the closed position, surround the cable port 42 and wrap a cable inserted in the cable port 42.

In the open position, the free ends 66, 67 of the main portion 59 and the movable portion 63 are disengaged from each other and the movable portion 63 allows access to the cable port 42 from a radial direction. In the open position the movable portion 63 does not prevent the access to the cable port 42 and a passage is formed for accessing the cable port 42.

The movable portion 63 is located at a side of the sealing assembly 40 where the access 44 is provided, so that when the movable portion 51 is in the open position the access 44 can be reached.

When the movable portion 51 of the first member 46 and the movable portion 63 of the second member 58 are in the open position a cable is allowed to enter the cable port 42 through the access 44 via an elastic deformation of the elastically deformable sealing module 43.

When the movable portion 51 of the first member 46 and/or the movable portion 63 of the second member 58 are in the dosed position a cable is not allowed to exit the cable port 42 through the access 44.

The movements of the movable portions 51, 63 of the first member 46 and second member 58 of the sealing assembly 40 between the closed position and the open position do not commutate the access 44 of the elastically deformable sealing module 40 into the open position. As a consequence, when a cable is inserted into the cable port 42 and the movable portions 51, 63 of the first member 46 and second member 58 are moved to the open position, the access 44 is still closed and the cable is still retained by the elastically deformable sealing module 43. In order to extract the cable from the elastically deformable sealing module 43 a manual force is required for elastically deforming sealing module 43 in order to open the access 44.

Each sealing assembly 40 comprises a pressure element 68 adapted to axially compress the elastically deformable sealing module 43 between the respective first member 46 and second member 58. In this way the elastically deformable sealing module 43 radially expands and presses against the cable so as to axially constrain the cable. This prevents the cable from axially move with respect to the elastically deformable sealing module 43 and seals the cable within the cable port 42.

When the elastically deformable sealing module 43 is inserted into the respective recess 28, the radial expansion of the elastically deformable sealing module 43 presses the elastically deformable sealing module 43 against the lateral surfaces 23 of the radial projections 22, thus sealing the elastically deformable sealing module 43 within the recesses 28 and preventing axial movement of the elastically deformable sealing module 43 with respect to the recess 28.

Therefore, due to the sealing of the cable ports 42 and the recesses 28 determined by the axial compression of the elastically deformable sealing module 43 and due to the continuous seals 45b which abuts against the cylindrical wall 11, the opening 14 of the telecommunication enclosure 1 can be sealed by the base 20 and the sealing assemblies 40.

The pressure element 68 can be actuated by a user after the cable is inserted into the access 44, after the movable portions 51, 61 are commutated in the closed position and after the sealing assembly 40 is inserted into the respective recess 28. The pressure element 68 may be a screw tightener.

In use, the cavity of the telecommunication enclosure 1 can be accessed by decoupling the base 20 from the casing 10.

After decoupling the base 20 from the telecommunications enclosure 1, one sealing assembly 40 can be axially removed from the respective recess 28 of the retaining body 21. This may require decompressing the elastically deformable sealing module 43 by easing the pressure between the first member 46 and the second member 58.

Subsequently, the movable portions 51, 63 are commutated from the closed position to the open position.

When the movable portions 51, 63 are in the open position, a cable C can be inserted in the cable port 42 through the access 44. This can be performed by radially pressing the cable C into the access 44 so as to elastically deform the elastically deformable sealing module 43.

Similarly, when the movable portions 51, 63 are in the open position, a cable C can be removed from the cable port 42 through the access 44. This can be performed by pulling the cable C so as to open the access 44 by elastically deform the elastically deformable sealing module 43.

Subsequently, the movable portions 51, 63 can be moved from the open position to the closed position.

The sealing assembly 40 can then be axially inserted into the recess 28 of the retaining body 21.

Then, the elastically deformable sealing module 43 can be axially compressed between the first member 46 and the second member 58, so as to seal the cable C into the cable port 42, to seal the sealing assembly 40 into the recess 28 and to constrain the cable C into the cable port 42.

The base 20 can be then coupled to the telecommunications enclosure 1.

The invention claimed is:

1. A telecommunications enclosure comprising:
a casing defining an inner cavity for housing a telecommunications module,
a base adapted to be removably coupled to the casing to close the casing, and
a plurality of sealing assemblies adapted to be removably coupled to the base,
wherein each sealing assembly of said plurality of sealing assemblies comprises an elastically deformable sealing module, a first member and a second member, the elastically deformable sealing module being interposed between the first member and the second member, and the elastically deformable sealing module, the first member and the second member defining a respective cable port;
wherein the first member of each sealing assembly comprises a main portion and a movable portion; and
wherein the second member of each sealing assembly comprises a main portion and a movable portion;
wherein the movable portion of the first member and the movable portion of the second member are movable between an open position, wherein a cable is allowed to access to the elastically deformable sealing module, and a closed position;
wherein the elastically deformable sealing module of each sealing assembly has an access to allow the cable to enter the respective cable port when the movable portion of the respective first member and the movable portion of the respective second member are in the open position;
wherein in the closed position, the movable portion of each first member is coupled to the respective main portion and the movable portion of each second member is coupled to the respective main portion so as to wrap the cable in said respective cable port;
wherein the elastically deformable sealing module of each sealing assembly is held by the main portion of the first member and by the main portion of the second member of the sealing assembly while the respective movable portion of the first member and the respective movable portion of the second member are in the open position; and
wherein the elastically deformable sealing module of each sealing assembly is configured to hold the cable in the respective cable port by encircling the cable while at least one of the respective movable portion of the first member and the respective movable portion of the second member is in the open position.

2. The telecommunications enclosure according to claim 1, wherein the access of the elastically deformable sealing module of each sealing assembly is commutable between an open condition for entering of the cable into the respective cable port and a closed condition.

3. The telecommunications enclosure according to claim 2, wherein the commutations of the access of each elastically deformable sealing module between the open condition and the closed condition and between the closed condition and the open condition are actuated through an elastic deformation of the access.

4. The telecommunications enclosure according to claim 2, wherein movements of the movable portions of the first member and the second member of each sealing assembly between the closed position and the open position do not have any effect on the respective elastically deformable sealing module.

5. The telecommunications enclosure according to claim 1, wherein each sealing assembly comprises a pressure element adapted to axially compress the elastically deformable sealing module between the respective first member and second member.

6. The telecommunications enclosure according to claim 1, wherein the main portion and the movable portion of the first member of each sealing assembly are hinged to each other at respective hinged ends; and wherein the main portion and the movable portion of the second member of each sealing assembly are hinged to each other at respective hinged ends.

7. The telecommunications enclosure according to claim 1, wherein each sealing assembly is adapted to be individually and separately coupled to and decoupled from the base.

8. The telecommunications enclosure according to claim 1, wherein the base comprises a retaining body having a plurality of recesses each of which adapted to receive a respective sealing assembly.

9. The telecommunications enclosure according to claim 8, wherein the retaining body comprises a plurality of radial projections, each recess of the plurality of recesses being formed between two circumferentially consecutive projections.

10. The telecommunications enclosure according to claim 9, wherein for each recess of the plurality of recesses, the retaining body comprises a strengthen element coupled to two circumferentially consecutive projections of said plurality of radial projections.

11. The telecommunications enclosure according to claim 10, wherein each strengthen element is hinged to one projections of two circumferentially consecutive projections of said plurality of radial projections and is removably coupled to the other projections of the two circumferentially consecutive projections.

12. The telecommunications enclosure according to claim 1, wherein the access of the elastically deformable sealing module of each sealing assembly is configured to allow the cable to radially enter the respective cable port.

13. The telecommunications enclosure according to claim 1, wherein the elastically deformable sealing module is made of a gel-like material or an elastomeric material.

14. The telecommunications enclosure according to claim 1, wherein each elastically deformable sealing module is made of a single piece of material.

15. A method for coupling a cable to a cable port at least partially defined by a sealing assembly of a telecommunications enclosure, wherein the sealing assembly comprises an elastically deformable sealing module interposed between a first member and a second member; wherein the first member and the second member of the sealing assembly each comprise a respective main portion and a respective movable portion, the movable portion of the first member being movable between an open position and a closed position and the movable portion of the second member being movable between an open position and a closed position; and wherein the elastically deformable sealing module is configured to hold the cable in the respective cable port by encircling the cable while at least one of the respective movable portion of the first member and the respective movable portion of the second member is in the open position; the method comprising:
  decoupling the sealing assembly from the telecommunications enclosure;
  moving the movable portion of the first member and the movable portion of the second member of the sealing assembly from the closed position to the open position while the elastically deformable sealing module is held by the main portion of the first member and by the main portion of the second member;
  inserting the cable into the cable port through an access defined in the elastically deformable sealing module of the sealing assembly when the movable portion of the first member and the movable portion of the second member are in the open position;
  holding the cable in the cable port by encircling the cable with the elastically deformable sealing module while at least one of the respective movable portion of the first member and the respective movable portion of the second member is in the open position;
  moving the movable portion of the first member and the movable portion of the second member of the sealing assembly from the open position to the closed position so as to wrap the cable into said cable port; and
  coupling the sealing assembly to the telecommunications enclosure.

16. The telecommunications enclosure according to claim 2, wherein moving the movable portion of the first member of each sealing assembly between the closed position and the open position and/or moving the movable portion of the second member of each sealing assembly between the closed position and the open position does not commutate the access of the respective elastically deformable sealing module into the open condition.

17. The telecommunications enclosure according to claim 1, wherein the elastically deformable sealing module of each sealing assembly is only held by the main portion of the first member and by the main portion of the second member of the sealing assembly while the respective movable portion of the first member and the respective movable portion of the second member are in the open position, the respective movable portion of the first member and the respective movable portion of the second member not being directly attached to the elastically deformable sealing module.

18. A telecommunications enclosure comprising:
  a casing defining an inner cavity for housing a telecommunications module, a base adapted to be removably coupled to the casing to close the casing, and
  a plurality of sealing assemblies adapted to be removably coupled to the base, wherein each sealing assembly of said plurality of sealing assemblies comprises an elastically deformable sealing module, a first member and a second member, the elastically deformable sealing module being interposed between the first member and the second member, and the elastically deformable sealing module, the first member and the second member defining a respective cable port;
  wherein the first member of each sealing assembly comprises a main portion and a movable portion; and
  wherein the second member of each sealing assembly comprises a main portion and a movable portion;
  wherein the movable portion of the first member and the movable portion of the second member are movable between an open position, wherein a cable is allowed to access to the elastically deformable sealing module, and a closed position;
  wherein the elastically deformable sealing module of each sealing assembly has an access to allow the cable to enter the respective cable port when the movable portion of the respective first member and the movable portion of the respective second member are in the open position;
  wherein in the closed position, the movable portion of each first member is coupled to the respective main portion and the movable portion of each second member is coupled to the respective main portion so as to wrap the cable in said respectively cable port;
  wherein the elastically deformable sealing module of each sealing assembly is held by the main portion of the first member and by the main portion of the second member of the sealing assembly while the respective movable portion of the first member and the respective movable portion of the second member are in the open position;

wherein the access of each elastically deformable sealing module is commutable between an open condition for entering of the cable into the respective cable port and a closed condition; and wherein moving the movable portion of the first member of each sealing assembly between the closed position and the open position and/or moving the movable portion of the second member of each sealing assembly between the closed position and the open position does not commutate the access of the respective elastically deformable sealing module into the open condition.

19. A telecommunications enclosure comprising:

a casing defining an inner cavity for housing a telecommunications module, a base adapted to be removably coupled to the casing to close the casing, and a plurality of sealing assemblies adapted to be removably coupled to the base, wherein each sealing assembly of said plurality of sealing assemblies comprises an elastically deformable sealing module, a first member and a second member, the elastically deformable sealing module being interposed between the first member and the second member, and the elastically deformable sealing module, the first member and the second member defining a respective cable port;

wherein the first member of each sealing assembly comprises a main portion and a movable portion; and wherein the second member of each sealing assembly comprises a main portion and a movable portion;

wherein the movable portion of the first member and the movable portion of the second member are movable between an open position, wherein a cable is allowed to access to the elastically deformable sealing module, and a closed position;

wherein the elastically deformable sealing module of each sealing assembly has an access to allow the cable to enter the respective cable port when the movable portion of the respective first member and the movable portion of the respective second member are in the open position;

wherein in the closed position, the movable portion of each first member is coupled to the respective main portion and the movable portion of each second member is coupled to the respective main portion so as to wrap the cable in said respectively cable port;

wherein the elastically deformable sealing module of each sealing assembly is only held by the main portion of the first member and by the main portion of the second member of the sealing assembly while the respective movable portion of the first member and the respective movable portion of the second member are in the open position, the respective movable portion of the first member and the respective movable portion of the second member not being directly attached to the elastically deformable sealing module.

* * * * *